United States Patent
Bonanno et al.

(10) Patent No.: US 11,163,573 B2
(45) Date of Patent: Nov. 2, 2021

(54) HIERARCHICAL METADATA PREDICTOR WITH PERIODIC UPDATES

(71) Applicant: International Business Machines Corporation, Armonk, NY (US)

(72) Inventors: James Bonanno, Wappingers Falls, NY (US); Varnika Atmakuri, West Windsor, NJ (US); Adam Collura, Hopewell Junction, NY (US); Brian Robert Prasky, Campbell Hall, NY (US); Anthony Saporito, Highland, NY (US); Suman Amugothu, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 57 days.

(21) Appl. No.: 16/274,710

(22) Filed: Feb. 13, 2019

(65) Prior Publication Data

US 2020/0257534 A1    Aug. 13, 2020

(51) Int. Cl.
*G06F 9/30* (2018.01)
*G06F 9/38* (2018.01)

(52) U.S. Cl.
CPC ........ *G06F 9/3806* (2013.01); *G06F 9/30145* (2013.01); *G06F 9/3808* (2013.01)

(58) Field of Classification Search
None
See application file for complete search history.

(56) References Cited

U.S. PATENT DOCUMENTS

| | | | | |
|---|---|---|---|---|
| 6,134,634 A | * | 10/2000 | Marshall, Jr. | ....... G06F 12/0804 711/141 |
| 6,553,488 B2 | * | 4/2003 | Yeh | ....................... G06F 9/3806 712/239 |
| 7,024,545 B1 | * | 4/2006 | Zuraski, Jr. | ........... G06F 9/3848 712/237 |
| 7,783,870 B2 | | 8/2010 | Levitan et al. | |

(Continued)

OTHER PUBLICATIONS

Kharbutli et al.; Counter-Based Cache Replacement Algorithms; 2005; IEEE.*

(Continued)

*Primary Examiner* — Corey S Faherty
(74) *Attorney, Agent, or Firm* — Cantor Colburn LLP; Margaret McNamara (57) ABSTRACT

A system includes a hierarchical metadata predictor and a processing circuit. The hierarchical metadata predictor includes a first-level metadata predictor and a second-level metadata predictor. The processing circuit is configured to perform a plurality of operations including storing new or updated metadata into the first-level metadata predictor and searching the first-level metadata predictor for a metadata prediction. Responsive to finding the metadata prediction in the first-level metadata predictor, the metadata prediction is output corresponding to an entry of the first-level metadata predictor that is a hit. One or more entries of the first-level metadata predictor that are non-hits are periodically written to the second-level metadata predictor. The first-level metadata predictor is updated based on locating the metadata prediction in the second-level metadata predictor.

20 Claims, 6 Drawing Sheets

(56) References Cited

U.S. PATENT DOCUMENTS

| | | |
|---|---|---|
| 9,235,419 B2 | 1/2016 | Bonanno et al. |
| 9,298,465 B2 | 3/2016 | Bonanno et al. |
| 9,411,598 B2* | 8/2016 | Bonanno ............. G06F 9/30145 |
| 2004/0015683 A1* | 1/2004 | Emma .................. G06F 9/3806 |
| | | 712/240 |
| 2013/0339694 A1 | 12/2013 | Bonanno et al. |
| 2020/0012497 A1* | 1/2020 | Clouqueur .......... G06F 9/30058 |

OTHER PUBLICATIONS

Juang et al. "Implementing branch-predictor decay using quasi-static memory cells." ACM Transactions on Architecture and Code Optimization (TACO) 1.2 (2004): 180-219.

Lee,. Aspects of full-custom VLSI microprocessor design and implementation. California Univ Berkeley Dept of Electrical Engineering and Computer Sciences, 1989, 130 pages.

Warnock et al. "Circuit and Physical Design Implementation of the Microprocessor Chip for the zEnterprise System." J. Solid-State Circuits 47.1 (2012): 151-163.

* cited by examiner

FIG. 6

# HIERARCHICAL METADATA PREDICTOR WITH PERIODIC UPDATES

BACKGROUND

The present invention relates to computer systems, and more particularly, to a hierarchical metadata predictor with periodic updates.

Various predictors can be incorporated in a pipelined high-frequency microprocessor. Predictors can track various types of metadata for predictions, such as making branch instruction predictions. With respect to branch instructions, metadata prediction can be used to predict the direction (taken vs. not taken) and the target address of each branch instruction. This can allow processing to continue along a predicted path of a branch rather than having to wait for the outcome of the branch to be determined. A penalty is incurred if a branch is predicted incorrectly. A pipelined branch predictor takes several cycles to make a prediction.

Traditionally, branch prediction is used to steer the flow of instructions down a processor pipeline along the most likely path of code to be executed within a program. Branch prediction uses historical information to predict whether or not a given branch will be taken or not taken, such as predicting which portion of code included in an IF-THEN-ELSE structure will be executed based on which portion of code was executed in the past. The target of the branch that is expected to be the first taken branch is then fetched and speculatively executed. If it is later determined that the prediction was wrong, then the speculatively executed or partially executed instructions are discarded and the pipeline starts over with the instruction proceeding to branch with the correct branch path, incurring a delay between the branch and the next instruction to be executed. Branch prediction structures have limited storage capacity and are constrained by access and search times.

SUMMARY

According to a non-limiting embodiment, a system includes a hierarchical metadata predictor and a processing circuit. The hierarchical metadata predictor includes a first-level metadata predictor and a second-level metadata predictor. The processing circuit is configured to perform a plurality of operations including storing new or updated metadata into the first-level metadata predictor and searching the first-level metadata predictor for a metadata prediction. Responsive to finding the metadata prediction in the first-level metadata predictor, the metadata prediction is output corresponding to an entry of the first-level metadata predictor that is a hit. One or more entries of the first-level metadata predictor that are non-hits are periodically written to the second-level metadata predictor. The first-level metadata predictor is updated based on locating the metadata prediction in the second-level metadata predictor.

According to a non-limiting embodiment, a method includes storing, by a processing circuit, new or updated metadata into a first-level metadata predictor of a hierarchical metadata predictor. The processing circuit can search the first-level metadata predictor for a metadata prediction. Responsive to finding the metadata prediction in the first-level metadata predictor, the metadata prediction corresponding to an entry of the first-level metadata predictor that is a hit can be output. Periodically one or more entries of the first-level metadata predictor that are non-hits can be written to a second-level metadata predictor of the hierarchical metadata predictor. The first-level metadata predictor can be updated based on locating the metadata prediction in the second-level metadata predictor.

According to a non-limiting embodiment, a computer program product includes a computer readable storage medium having program instructions embodied therewith. The program instructions are executable by a processing circuit to perform a plurality of operations including storing new or updated metadata into a first-level metadata predictor of a hierarchical metadata predictor and searching the first-level metadata predictor for a metadata prediction. Responsive to finding the metadata prediction in the first-level metadata predictor, the metadata prediction corresponding to an entry of the first-level metadata predictor that is a hit can be output. Periodically one or more entries of the first-level metadata predictor that are non-hits can be written to a second-level metadata predictor of the hierarchical metadata predictor. The first-level metadata predictor can be updated based on locating the metadata prediction in the second-level metadata predictor.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" can include any integer number greater than or equal to one, i.e. one, two, three, four, etc. The terms "a plurality" can include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, in computer systems, metadata prediction can be implemented using a plurality of structures in one or more processors. A branch target buffer (BTB) is a structure that stores branch and target information for branch prediction, as one example of metadata prediction. Other structures, such as a branch history table (BHT), pattern history table (PHT), and multiple target table (MTT), can be included to store additional information used for branch direction and target prediction, as other examples of metadata prediction.

A BTB can be searched in parallel to and independently from instruction fetching to find upcoming branches, in which case it is called "lookahead branch prediction". Alternatively, the BTB can be accessed simultaneously with or after fetching instructions and determining instruction boundaries in order to provide a prediction for each encountered branch instruction, in which case it is called "synchronous branch prediction". In either case, the performance benefit of the BTB is a function of the accuracy of the prediction provided by the BTB and the latency to access the BTB.

Branches can be stored in BTBs and other structures as a function of a branch instruction address. Some bits of the branch instruction address can be used to index tables, and additional bits can be used as tags within the entries to reduce aliasing.

As with instruction and data caches, metadata predictors can be organized in a hierarchical way with several structures with various capacities and latencies. Unlike instruction and data caches, there is additional flexibility in the design considerations of metadata caches since prediction metadata can be wrong. Metadata predictors can be tagless or partially tagged. Further, metadata predictors can be allowed to contain duplicate data. Metadata hierarchies may not be strictly exclusive or inclusive across each level.

One approach to implementing a hierarchical metadata predictor includes using an intermediate structure, such as a BTB preload table (BTBP), which can be searched in parallel with a first-level BTB and serve as a filter to prevent hits from other levels of the hierarchy from creating duplicates in the first-level BTB. A BTBP can also serve as a victim buffer for predictions evicted out of the first-level BTB. While a BTBP can provide a number of advantages, the BTBP may consume a large quantity of resources, such as physical space and power, which can limit the availability of those resources for other structures within a processor.

Turning now to an overview of the aspects of the invention, one or more embodiments of the invention address the above-described shortcomings of the prior art by performing semi-inclusive hierarchical metadata prediction that allows a hierarchical metadata predictor to be periodically updated in multiple levels of prediction structures. Periodic updates can provide an efficient way of updating prediction information in one or more higher levels of the hierarchy. The hierarchical metadata predictor may use read-before-write directories to prevent duplication. Update policies, such as overwriting least-recently-used (LRU) entries, and events triggering writes to LRU states to make entries most-recently-used in the various hierarchies can encourage inclusivity within the hierarchical metadata predictor.

The above-described aspects of the invention address the shortcomings of the prior art by incorporating a hierarchical metadata predictor in a processing system. Managing installation, updates, and movement of entries between multiple levels of a hierarchical metadata predictor can enable a semi-inclusive structure for metadata prediction as further described herein. Technical effects and benefits can include eliminating intermediate predictor structures, such as a BTBP, to free chip area and power for other structures or larger predictor structure sizes.

Figure 1:
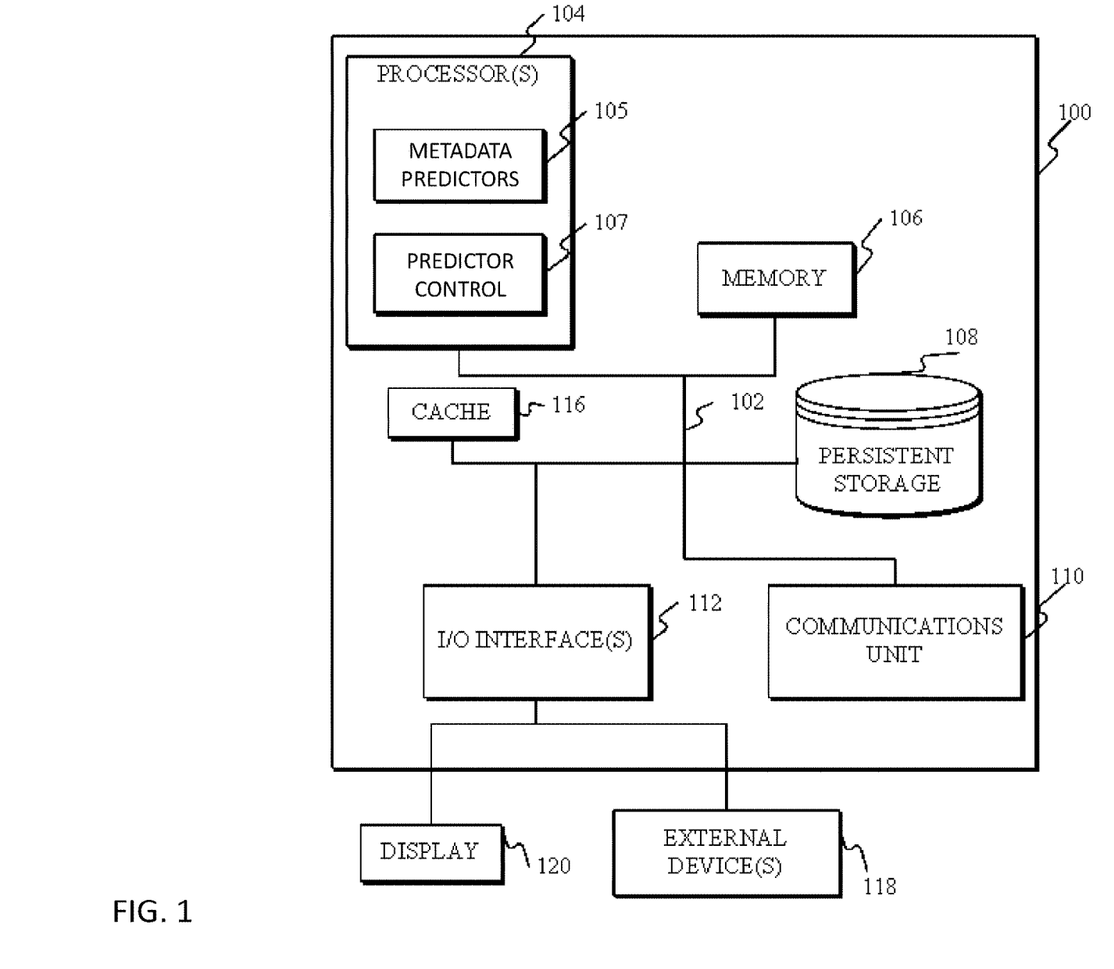
FIG. 1 is a block diagram illustrating a computer system in accordance with various embodiments of the invention.

Turning now to a more detailed description of aspects of the present invention, FIG. 1 depicts computer system 100, which is an example of a system that includes embodiments of the present invention. Computer system 100 includes communications fabric 102, which provides communications between computer processor(s) 104 including metadata predictors 105 and predictor control 107, memory 106, persistent storage 108, communications unit 110, input/output (I/O) interface(s) 112, and cache 116. Communications fabric 102 can be implemented with any architecture designed for passing data and/or control information between processors (such as microprocessors, communications and network processors, etc.), system memory, peripheral devices, and any other hardware components within a system. For example, communications fabric 102 can be implemented with one or more buses.

Memory 106 and persistent storage 108 are computer readable storage media. In this embodiment, memory 106 includes random access memory (RAM). In general, memory 106 can include any suitable volatile or non-volatile computer readable storage media. Cache 116 is a fast memory that enhances the performance of processors 104 by holding recently accessed data and data near accessed data from memory 106. Cache 116 can be distributed within and/or external to processors 104 and may include instructions (e.g., Icache) and/or data (e.g., Dcache).

Program instructions and data used to practice embodiments may be stored in persistent storage 108 for execution by one or more of the respective processors 104 via cache 116 and one or more memories of memory 106. In an embodiment, persistent storage 108 includes a magnetic hard disk drive. Alternatively, or in addition to a magnetic hard disk drive, persistent storage 108 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 108 may also be removable. For example, a removable hard drive may be used for persistent storage 108. Other examples include optical and magnetic disks, thumb drives, and smart cards that are inserted into a drive for transfer onto another computer readable storage medium that is also part of persistent storage 108.

Communications unit 110, in these examples, provides for communications with other data processing systems or devices. In these examples, communications unit 110 includes one or more network interface cards. Communications unit 110 may provide communications through the use of either or both physical and wireless communications links. Program instructions and data used to practice embodiments may be downloaded to persistent storage 108 through communications unit 110.

I/O interface(s) 112 allows for input and output of data with other devices that may be connected to each computer system. For example, I/O interface 112 may provide a connection to external devices 118 such as a keyboard, keypad, a touch screen, and/or some other suitable input device. External devices 118 can also include portable computer readable storage media such as, for example, thumb drives, portable optical or magnetic disks, and memory cards. Software and data used to practice embodiments of can be stored on such portable computer readable storage media and can be loaded onto persistent storage 108 via I/O interface(s) 112. I/O interface(s) 112 also connect to a display 120. Display 120 provides a mechanism to display data to a user and can be, for example, a computer monitor.

Metadata predictors 105 and predictor control 107 can include one or more sets of hardware logic components capable of making and storing predictions for the location of branches, direction of branches, and other such information for an instruction stream of the processor(s) 104, for example, as processing circuitry of the processor(s) 104. Example embodiments of the metadata predictors 105 and predictor control 107 are further described herein in reference to FIGS. 2-6.

Figure 2:
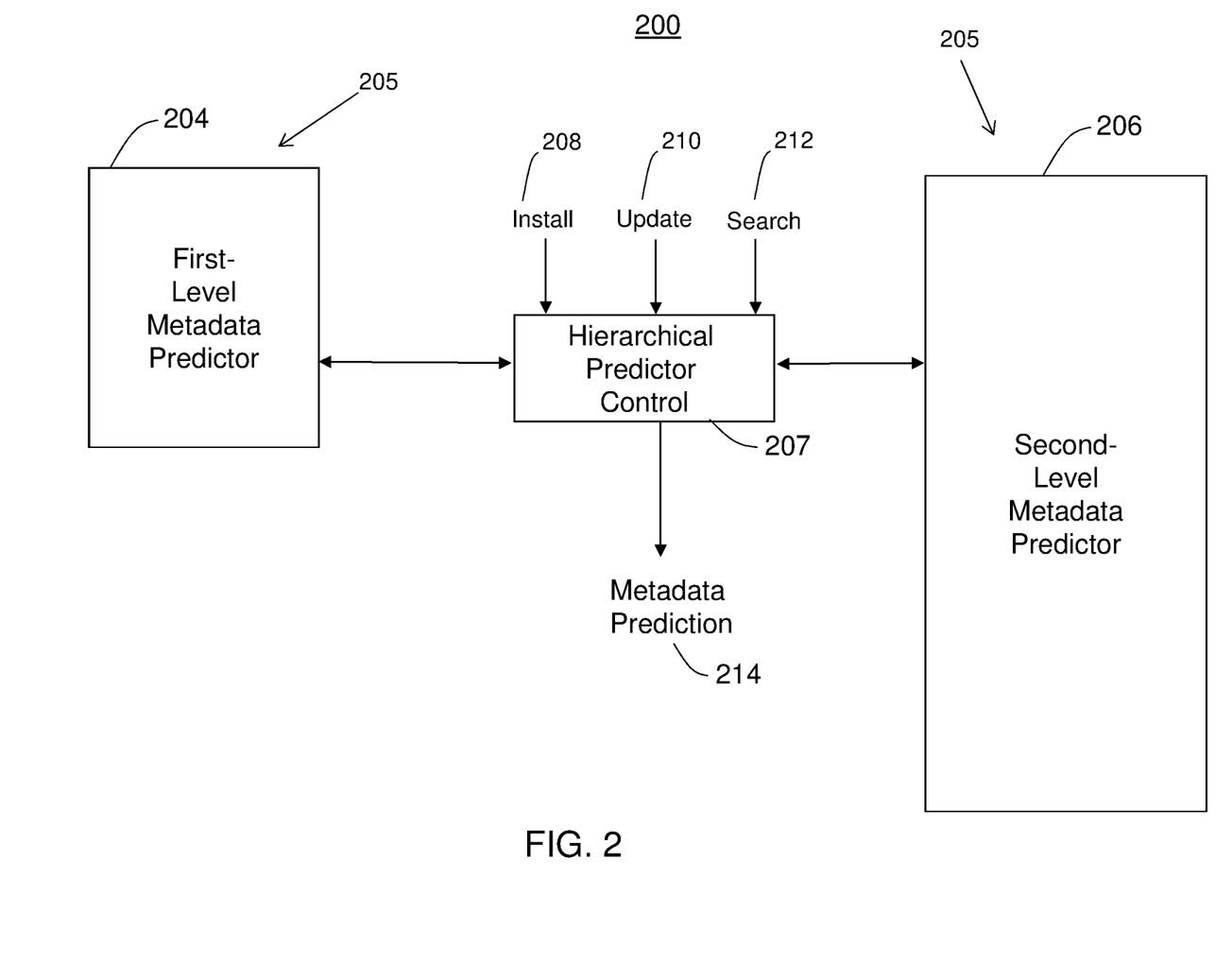
FIG. 2 is a block diagram illustrating a hierarchical metadata predictor according to a non-limiting embodiment.

FIG. 2 depicts a system 200 including a hierarchical metadata predictor 205 as an embodiment of the metadata predictors 105 of FIG. 1 and a hierarchical predictor control 207 as an embodiment of the predictor control 107 of FIG. 1. The example hierarchical metadata predictor 205 of FIG. 2 includes a first-level metadata predictor 204 and a second-level metadata predictor 206. The system 200 can also include auxiliary structures to support prediction, such as various target tables, history tables, indexing controls, and the like. The hierarchical predictor control 207 controls access and updates of entries in the first-level metadata predictor 204 and the second-level metadata predictor 206. In an exemplary embodiment, the first-level metadata predictor 204 is a primary predictor, and the second-level metadata predictor 206 is a secondary predictor. The hierarchical predictor control 207 can handle various events, such as an install 208, an update 210, a search 212, and/or other events (not depicted). Results of the search 212 can result in outputting of a metadata prediction 214, such as a predicted branch instruction address, branch direction, or other such metadata associated with patterns of instruction execution.

Each of the first-level metadata predictor 204 and second-level metadata predictor 206 can be set associative, including multiple sets of entries. The second-level metadata predictor 206 is a higher-level cache of metadata prediction information. The capacity of the second-level metadata predictor 206 can be greater than the capacity of the first-level metadata predictor 204 to store entries. The first-level metadata predictor 204 can cover a larger or equal to footprint than an instruction cache of the cache 116 of FIG. 1. For purposes of explanation, examples of the hierarchical metadata predictor 205 and hierarchical predictor control 207 are described with respect to branch prediction using multiple levels of BTBs. Although the example of FIG. 2 depicts a two-level hierarchy, it will be understood that embodiments can include additional levels.

Figure 3:
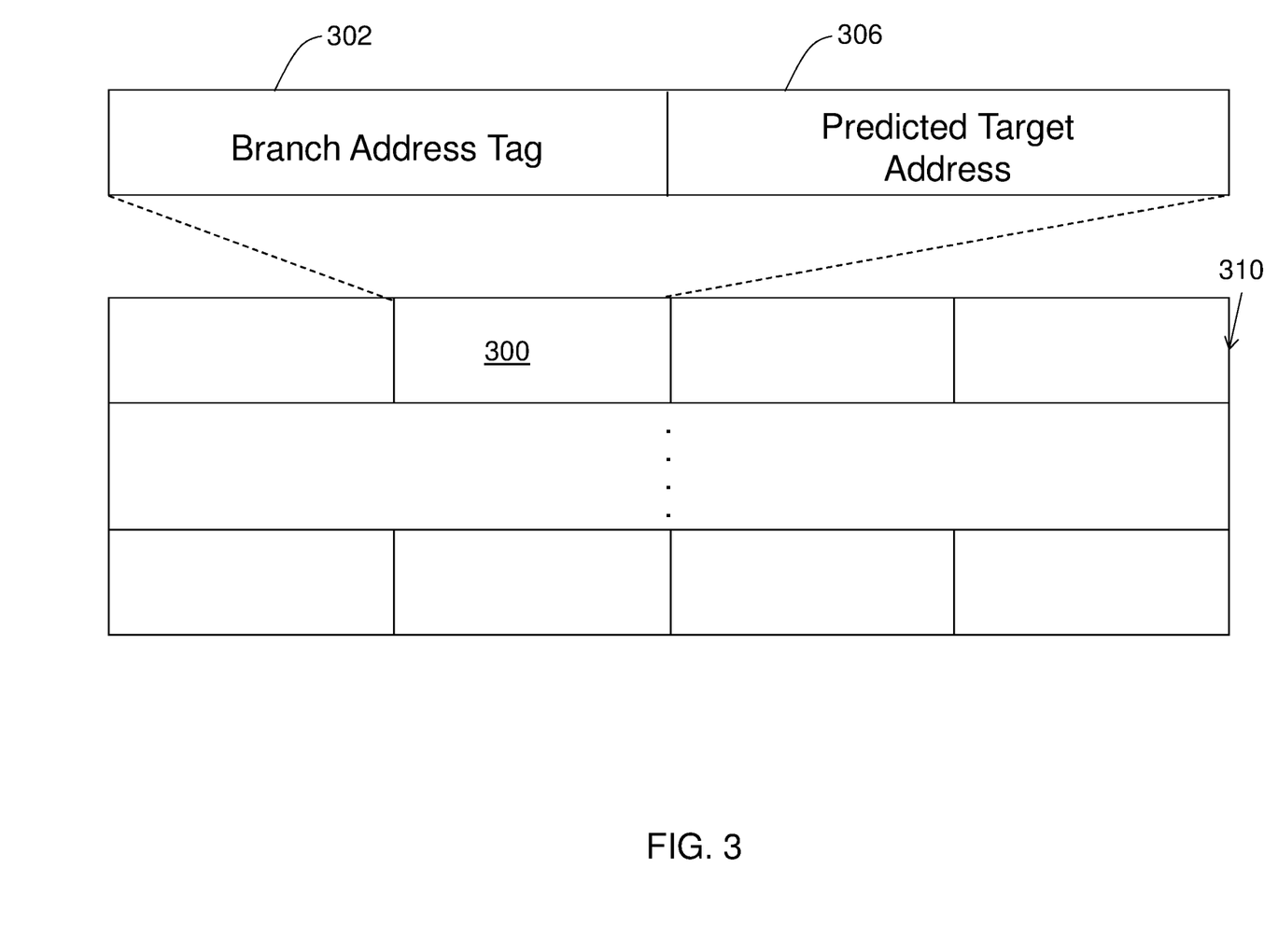
FIG. 3 is a block diagram illustrating a branch target buffer according to a non-limiting embodiment.

A general example of a BTB entry is depicted in FIG. 3 as BTB entry 300 (also referred to as entry 300), which can include a branch address tag 302 and a predicted target address 306. With continued reference to FIGS. 1-3, the branch address tag 302 can be used to locate an entry within a BTB row 310, where each of the first-level metadata predictor 204 and second-level metadata predictor 206 of FIG. 2 can include multiple BTB rows 310 and multiple set associative BTB entries per BTB row 310. The first-level metadata predictor 204 and second-level metadata predictor 206 can have different numbers of BTB rows 310 and columns (also referred to as "ways") relative to each other. The BTB rows 310 can be indexed with instruction address bits. For example, bits 48:58 of a 64-bit address may be used as an index per BTB row 310. Additional address bits can be stored as tag bits (e.g., branch address tag 302) within each entry 300. Each BTB entry 300 can include other branch prediction information (not depicted), such as a branch direction to indicate whether the associated branch was taken or not taken.

In an exemplary embodiment, a search address corresponding to a restart of instruction fetching in processors 104 of FIG. 1 can be sent to the hierarchical predictor control 207 as search 212, and the hierarchical predictor control 207 can thereafter operate asynchronously from instruction fetching until the next restart. When looking for branch predictions, the first-level metadata predictor 204 is read and can provide a branch prediction as the metadata prediction 214 if it contains an entry with a branch address tag 302 matching the search address. The first-level metadata predictor 204 provides input to the hierarchical predictor control 207 to determine whether a match or "hit" is located based on the search address. If a match is found, the hierarchical predictor control 207 can output a predicted target address and/or branch direction as the metadata prediction 214. If a match is not found, sequential searching of the first-level metadata predictor 204 can continue over a search range before declaring a miss (i.e., a non-hit) and taking further action through the second-level metadata predictor 206.

The search range of the first-level metadata predictor 204 can be established by the hierarchical predictor control 207. In embodiments, the hierarchical predictor control 207 can determine a predicted stream length between an instruction address and a taken branch ending an instruction stream. The first-level metadata predictor 204 can be searched for a branch prediction in one or more entries 300 in a search range bounded by the instruction address and the predicted stream length. A search of the second-level metadata predictor 206 can be triggered based on failing to locate the branch prediction in the search range. Branch prediction information found in the second-level metadata predictor 206 can be used directly by the hierarchical predictor control 207 to make a metadata prediction 214 directly. Alternatively, such prediction information can be treated as a bulk preload of likely to be useful information that is written into the first-level metadata predictor 204 for future use but not used immediately and directly from the second-level metadata predictor 206.

Figure 4:
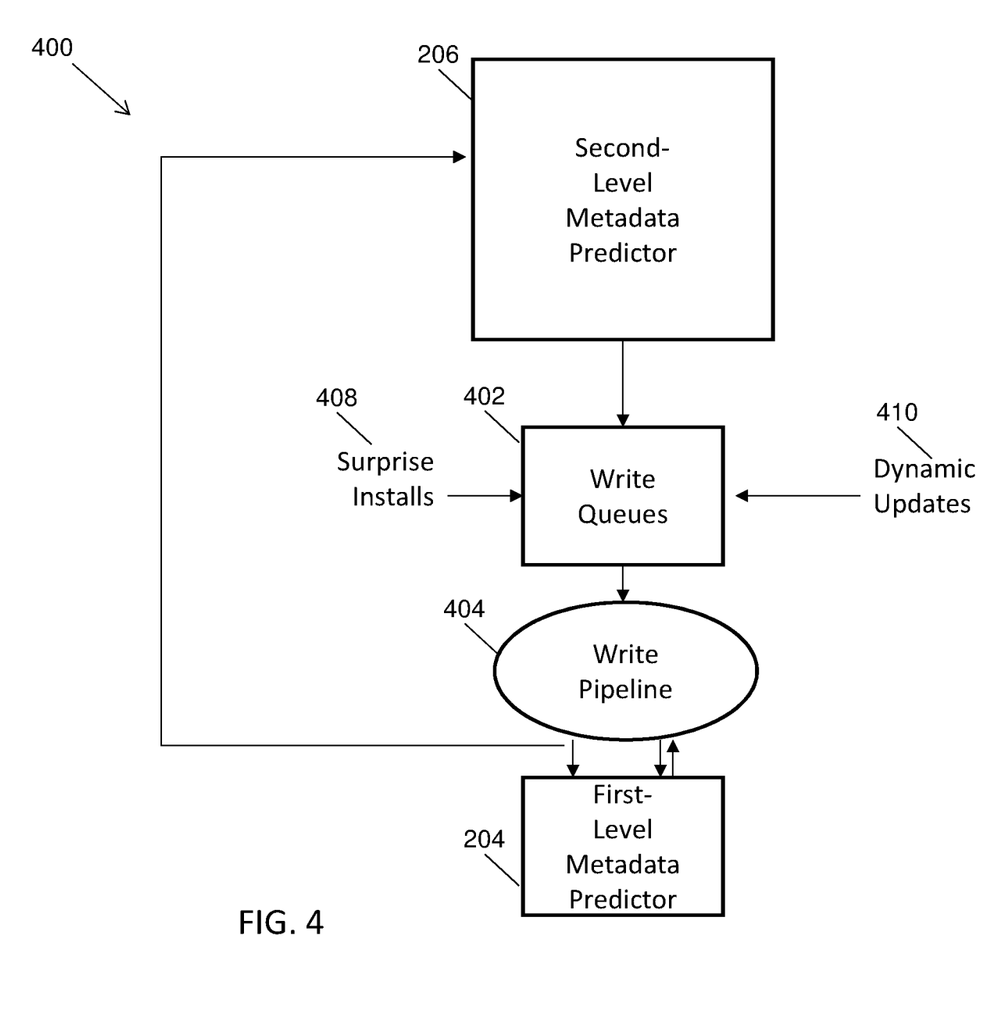
FIG. 4 is a block diagram illustrating a write control for a hierarchical branch predictor according to a non-limiting embodiment.

FIG. 4 is a block diagram illustrating a write control 400 for the hierarchical metadata predictor 205 of FIG. 2 according to a non-limiting embodiment of the present invention. New metadata, from surprise branches encountered in processors 104, or from architected preload instructions, or any other source, can be installed as surprise installs 408 into both the first-level metadata predictor 204 and second-level metadata predictor 206. Write queues 402 and write pipelines 404 can hold the data until access to write ports of the first-level metadata predictor 204 and/or second-level metadata predictor 206 is available.

For example, more incoming write requests can occur than write ports exist on the first-level metadata predictor 204 and/or second-level metadata predictor 206. Further, there may be limitations on whether or not simultaneous writes and reads can occur, resulting in a delay of writes. Upon a new install, if least-recently-used (LRU) information is being maintained due to the structures being organized in a set-associative way, the newly installed entries can be made most-recently-used (MRU) in both levels of the hierarchy. Whenever hits are found in the second-level metadata predictor 206 and are to be written into the first-level metadata predictor 204, the hits can also be written into write queues 402.

For writes queues 402 holding writes going into the first-level metadata predictor 204, they can be organized as a single queue for all sources of writes, or a set of queues divided by source. Priority logic can choose which writes to take out of the write queues 402 on a particular cycle and put into the write pipeline 404. As an example, a single write can be chosen per cycle. For installs, the write pipeline 404 can index the first-level metadata predictor 204 directory for reading. The directory can contain a subset of the full entry information—specifically validating information and the tags required to determine hit vs miss. Therefore, it is not necessary to read all entry content. This can be performed to check whether or not the information to install already exists in the first-level metadata predictor 204 to avoid duplication. There can be dedicated read ports for performing reads, or the same read ports used for regular searching can be used with arbitration logic to decide on a particular cycle about how to use each read port. If the data being searched for in the first-level metadata predictor 204 directory already exists, then no write would occur. Otherwise, the new data can be written in the first-level metadata predictor 204. With LRU replacement algorithms, the least-recently used entry can be replaced. For some types of write requests, such as dynamic updates 410, where prediction information is being updated for branches that were predicted from the first-level metadata predictor 204, the logic of the hierarchical predictor control 207 can assume that the branch is already present in the first-level metadata predictor 204 and skip read-before-write duplicate checking process.

Figure 5:
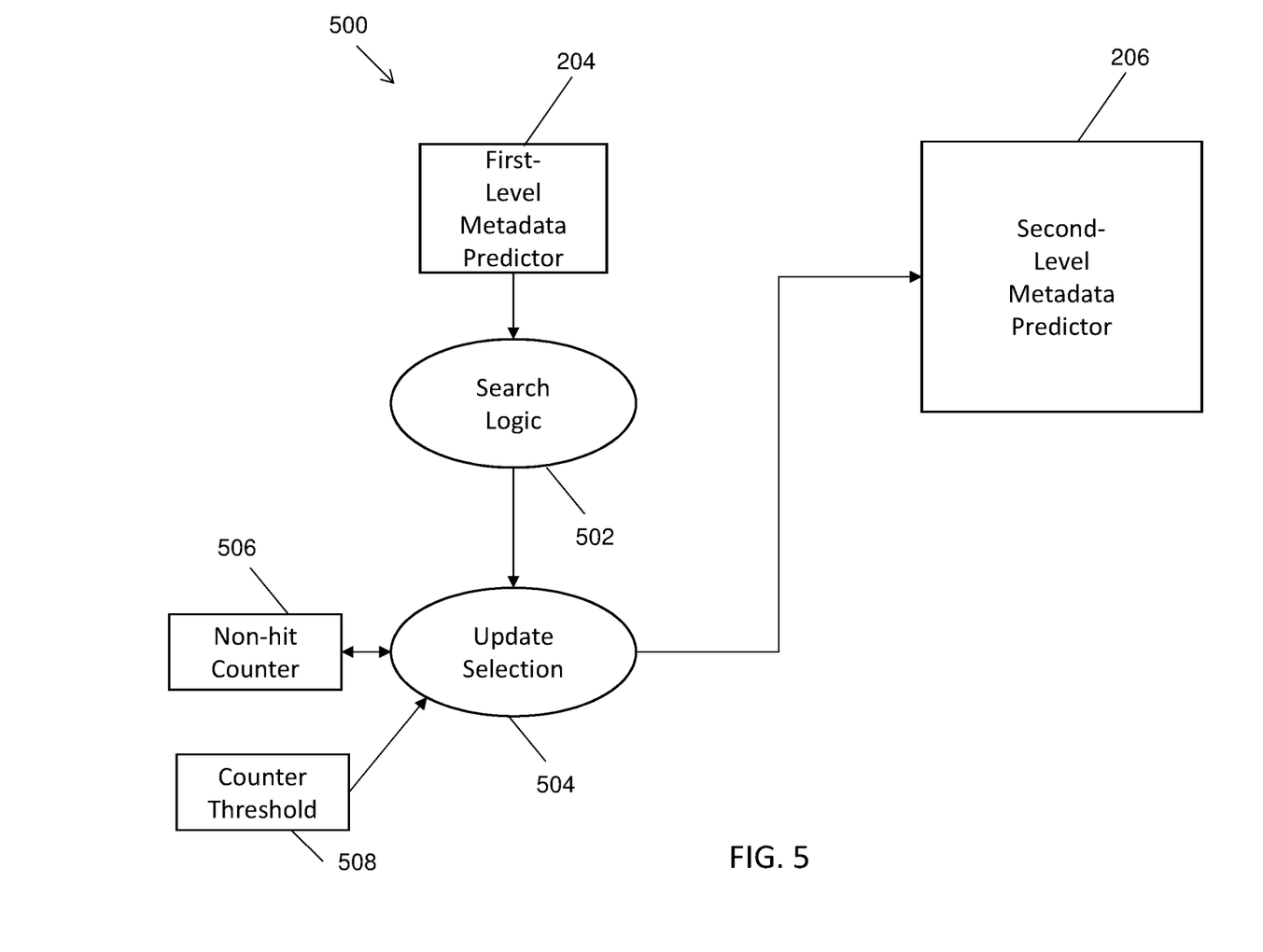
FIG. 5 is a block diagram illustrating a periodic update control for a hierarchical branch predictor according to a non-limiting embodiment.

FIG. 5 is a block diagram illustrating a periodic update control 500 for the hierarchical metadata predictor 205 of FIG. 2 according to a non-limiting embodiment of the present invention. The periodic update control 500 is described with respect to FIGS. 1-5. Search logic 502 may search the first-level metadata predictor 204. Searching of the first-level metadata predictor 204 can be performed in an asynchronous lookahead manner from the rest of the pipeline of processors 104 or may be performed in-line with instruction fetching, or decode, or any other stage in the processor pipeline. Searching, by search logic 502, can result in periodically writing non-hits into the second-level metadata predictor 206 and making MRU in the second-level metadata predictor 206 at that time through update selection 504. The search logic 502 and update selection 504 can be part of the hierarchical predictor control 207.

The first-level metadata predictor 204 can track a location (e.g., index, column/way) in the second-level metadata predictor 206 in which a corresponding branch exists. Index information can be a function of the already existing/known index and tag information of the first-level metadata predictor 204. Second-level metadata predictor 206 column information may be maintained for this purpose. Update selection 504 logic can determine when and which branch information to write into the second-level metadata predictor 206.

There are many ways the update selection 504 logic can be implemented. For example, change bits can be maintained in the first-level metadata predictor 204 indicating when content has changed and needs to be written. A set of approaches can maintain a non-hit counter 506 indicative of how often valid non-hits are encountered. Once a counter threshold 508 has been reached, a periodic update can be performed. When performing a periodic update, information at risk for being evicted from the first-level metadata predictor 204 can be selected. One way to do this can include reading the first-level metadata predictor 204 LRU with the search logic 502 and choosing an LRU column without a hit in a row being currently accessed. Alternatively, without having to read the first-level metadata predictor 204 LRU, a current first-level metadata predictor 204 column selection state can be selected that steps through the first-level metadata predictor 204 columns and gets incremented upon hitting the counter threshold 508 or another threshold. Upon hitting the counter threshold 508 a valid non-hit can be selected in a specified column, if there is one. Otherwise, a fixed order can be used to select from that point, i.e., search the columns in order starting from the "current column selection state". Alternatively, if the current column does not contain a valid non-hit, the update selection 504 may choose to not refresh anything and wait until there is a valid non-hit in that column. Upon updating, if LRU is maintained in the second-level metadata predictor 206, the entry being refreshed can be made MRU. Periodic refreshes can ensure that up to date prediction information is maintained in the second-level metadata predictor 206. Further, entries can be kept active in the second-level metadata predictor 206 after they have been evicted from the first-level metadata predictor 204 by making them MRU at around the time of eviction.

Performing periodic updating/refresh at search time instead of at actual eviction time of the first-level metadata predictor 204 may not require an extra read to get the victim data. Entries may already be read at search time, so it can be more efficient to do an update at that time.

Figure 6:
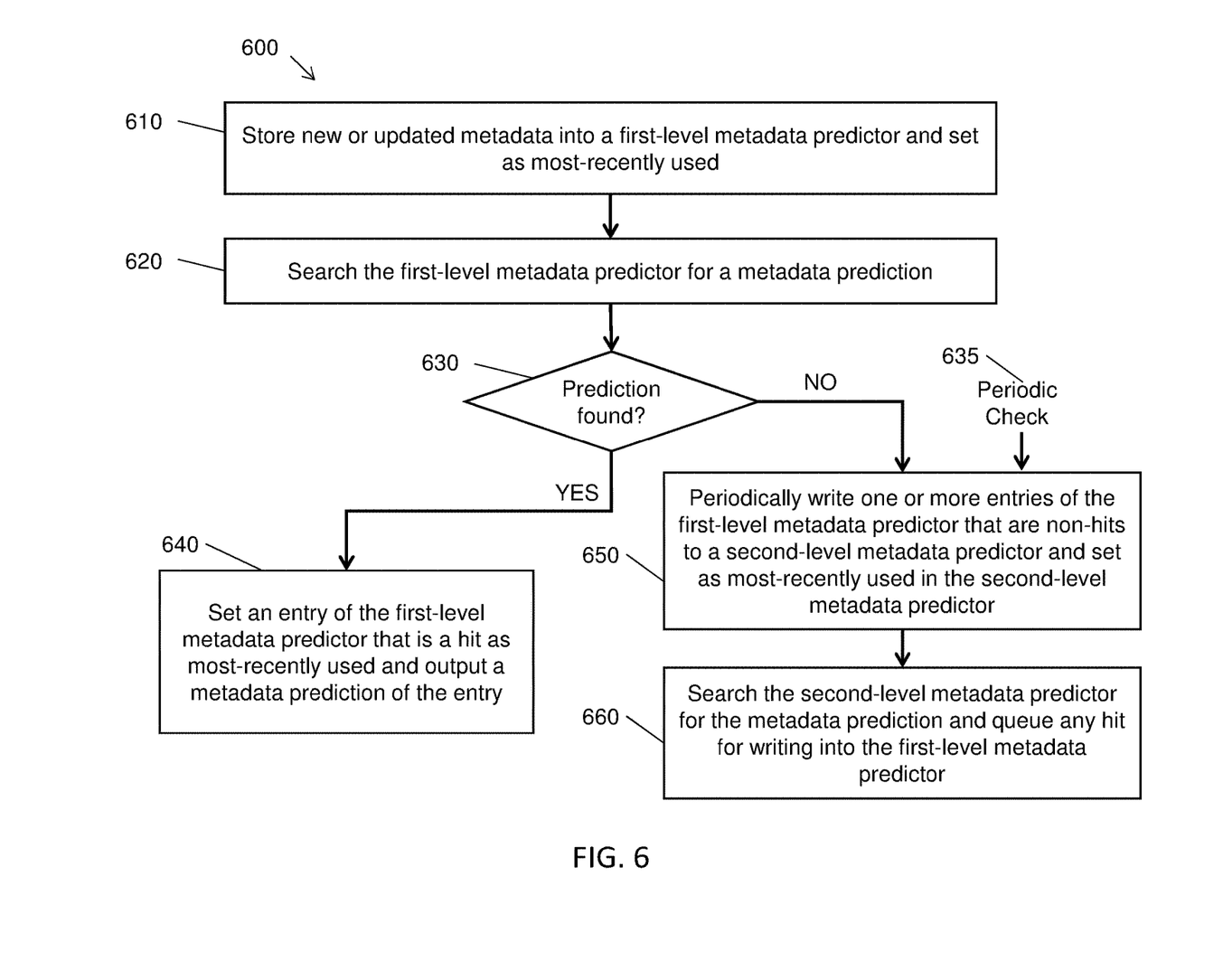
FIG. 6 is a flow diagram illustrating a method according to a non-limiting embodiment.

Turning now to FIG. 6, a flow diagram of a process 600 is generally shown in accordance with an embodiment. The process 600 is described with reference to FIGS. 1-6 and may include additional steps beyond those depicted in FIG. 6. The process 600 can be performed by a processing circuit of the processors 104 of FIG. 1, that may include, for example, the hierarchical predictor control 207 of FIG. 2. The example of FIG. 6 is described in reference to one or more entries of the hierarchical metadata predictor 205. Notably, when the first-level metadata predictor 204 and the second-level metadata predictor 206 are implemented as a set associative caches, each search can have multiple potential hits or misses across a multi-way row, such as row 310 of FIG. 3.

At block 610, a processing circuit of system 200 can store new or updated metadata into a first-level metadata predictor 204, such as a BTB1. At block 620, a processing circuit of the system 200 can search the first-level metadata predictor 204 for a metadata prediction 214. At block 630, if the metadata prediction 214 is found, the process 600 can advance to block 640. At block 640, responsive to finding the metadata prediction 214 in the first-level metadata predictor 204, the system 200 can output the metadata prediction 214 corresponding to an entry of the first-level metadata predictor 204 that is a hit. At block 630, if the metadata prediction 214 is not found, the process 600 can advance to block 650. At block 650, the system 200 can periodically write one or more entries of the first-level metadata predictor 204 that are non-hits to the second-level metadata predictor 206. Block 650 may also be performed periodically based on a periodic check 635 regardless of whether a search results in a hit at block 630. At block 660, the system 200 can update the first-level metadata predictor 204 based on locating the metadata prediction 214 in the second-level metadata predictor 206.

The one or more entries of the first-level metadata predictor 204 that are non-hits can be selected for writing to the second-level metadata predictor 206 based on using a non-hit counter 506 to compare with a counter threshold 508 and stepping through a plurality of columns of the first-level metadata predictor 204 based on the non-hit counter 506 reaching the counter threshold 508. Alternatively, the one or more entries of the first-level metadata predictor 204 that are non-hits can be selected for writing to the second-level metadata predictor 206 based on a least-recently-used indicator associated with the one or more entries.

In embodiments, a new or updated entry of the first-level metadata predictor 204 can be set as most-recently-used for tracking aging of entries for replacement. The entry of the first-level metadata predictor 204 can include the hit as most-recently used based on finding the metadata prediction 214 in the first-level metadata predictor 204. The one or more entries written to the second-level metadata predictor 206 can be set as most-recently used.

In embodiments, branch instruction prediction data associated with one or more surprise branches can be installed into the first-level metadata predictor 204 and the second-level metadata predictor 206. A plurality of entries including the branch instruction prediction data associated with one or more surprise branches can be set as most-recently-used in the first-level metadata predictor 204 and/or the second-level metadata predictor 206.

In embodiments, the second-level metadata predictor 206 can be set for the metadata prediction. Queuing any hit for writing into the first-level metadata predictor 204 can be performed through the write queues 402. A read-before-write check of the first-level metadata predictor 204 can be performed based on data in the write queues 402 and directory information of the first-level metadata predictor 204 to prevent duplicate installs of metadata in the first-level metadata predictor 204.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A system comprising:
   a hierarchical metadata predictor comprising a first-level metadata predictor and a second-level metadata predictor; and
   a processing circuit configured to perform a plurality of operations comprising:
      storing new or updated metadata into the first-level metadata predictor;
      searching the first-level metadata predictor for a metadata prediction;
      responsive to finding a metadata prediction in the first-level metadata predictor, outputting the metadata prediction, the metadata prediction corresponding to an entry of the first-level metadata predictor that is a hit;
      maintaining a non-hit counter indicative of a number of non-hits encountered during the searching of the first-level metadata predictor until a counter threshold is reached;
      periodically writing one or more entries of the first-level metadata predictor that are non-hits to the second-level metadata predictor after the non-hit counter reaches the counter threshold; and
      updating the first-level metadata predictor based on locating the metadata prediction in the second-level metadata predictor.

2. The system of claim 1, wherein the processing circuit is further configured to perform operations comprising:
   stepping through a plurality of columns of the first-level metadata predictor based on the non-hit counter reaching the counter threshold; and
   searching for a valid non-hit in an order starting based on a current column selection state of the first-level metadata predictor.

3. The system of claim 1, wherein the one or more entries of the first-level metadata predictor that are non-hits are selected for writing to the second-level metadata predictor based on a least-recently-used indicator associated with the one or more entries.

4. The system of claim 3, wherein the processing circuit is further configured to perform operations comprising:
   setting a new or updated entry of the first-level metadata predictor as most-recently-used;
   setting the entry of the first-level metadata predictor comprising the hit as most-recently-used based on finding the metadata prediction in the first-level metadata predictor; and setting the one or more entries written to the second-level metadata predictor as most-recently-used.

5. The system of claim 3, wherein the metadata comprises branch instruction prediction data and the processing circuit is further configured to perform operations comprising:
   installing branch instruction prediction data associated with one or more surprise branches into the first-level metadata predictor and the second-level metadata predictor; and
   setting a plurality of entries comprising the branch instruction prediction data associated with one or more surprise branches as most-recently-used in the first-level metadata predictor and the second-level metadata predictor.

6. The system of claim 1, further comprising a plurality of write queues and wherein the processing circuit is further configured to perform operations comprising:
   searching the second-level metadata predictor for the metadata prediction; and
   queuing any hit for writing into the first-level metadata predictor through the write queues.

7. The system of claim 6, wherein the processing circuit is further configured to perform operations comprising:
   performing a read-before-write check of the first-level metadata predictor based on data in the write queues and directory information of the first-level metadata predictor to prevent duplicate installs of metadata in the first-level metadata predictor.

8. A method comprising:
   storing, by a processing circuit, new or updated metadata into a first-level metadata predictor of a hierarchical metadata predictor;
   searching, by the processing circuit, the first-level metadata predictor for a metadata prediction;
   responsive to finding a metadata prediction in the first-level metadata predictor, outputting the metadata prediction, the metadata prediction corresponding to an entry of the first-level metadata predictor that is a hit;
   maintaining a non-hit counter indicative of a number of non-hits encountered during the searching of the first-level metadata predictor until a counter threshold is reached;
   periodically writing one or more entries of the first-level metadata predictor that are non-hits to a second-level metadata predictor of the hierarchical metadata predictor after the non-hit counter reaches the counter threshold; and
   updating the first-level metadata predictor based on locating the metadata prediction in the second-level metadata predictor.

9. The method of claim 8, further comprising:
   stepping through a plurality of columns of the first-level metadata predictor based on the non-hit counter reaching the counter threshold; and
   searching for a valid non-hit in an order starting based on a current column selection state of the first-level metadata predictor.

10. The method of claim 8, wherein the one or more entries of the first-level metadata predictor that are non-hits are selected for writing to the second-level metadata predictor based on a least-recently-used indicator associated with the one or more entries.

11. The method of claim 10, further comprising:
    setting a new or updated entry of the first-level metadata predictor as most-recently-used;
    setting the entry of the first-level metadata predictor comprising the hit as most-recently-used based on finding the metadata prediction in the first-level metadata predictor; and
    setting the one or more entries written to the second-level metadata predictor as most-recently-used.

12. The method of claim 10, wherein the metadata comprises branch instruction prediction data and further comprising:
    installing branch instruction prediction data associated with one or more surprise branches into the first-level metadata predictor and the second-level metadata predictor; and
    setting a plurality of entries comprising the branch instruction prediction data associated with one or more surprise branches as most-recently-used in the first-level metadata predictor and the second-level metadata predictor.

13. The method of claim 8, further comprising:
    searching the second-level metadata predictor for the metadata prediction; and
    queuing any hit for writing into the first-level metadata predictor through one or more write queues.

14. The method of claim 13, further comprising:
    performing a read-before-write check of the first-level metadata predictor based on data in the one or more write queues and directory information of the first-level metadata predictor to prevent duplicate installs of metadata in the first-level metadata predictor.

15. A computer program product comprising a computer readable storage medium having program instructions embodied therewith, the program instructions executable by a processing circuit to perform a plurality of operations comprising:
    storing new or updated metadata into a first-level metadata predictor of a hierarchical metadata predictor;
    searching the first-level metadata predictor for a metadata prediction;
    responsive to finding a metadata prediction in the first-level metadata predictor, outputting the metadata prediction, the metadata prediction corresponding to an entry of the first-level metadata predictor that is a hit;
    maintaining a non-hit counter indicative of a number of non-hits encountered during the searching of the first-level metadata predictor until a counter threshold is reached;
    periodically writing one or more entries of the first-level metadata predictor that are non-hits to a second-level metadata predictor of the hierarchical metadata predictor after the non-hit counter reaches the counter threshold; and
    updating the first-level metadata predictor based on locating the metadata prediction in the second-level metadata predictor.

16. The computer program product of claim 15, wherein the program instructions executable by the processing circuit are further configured to perform the operations comprising:
    stepping through a plurality of columns of the first-level metadata predictor based on the non-hit counter reaching the counter threshold; and
    searching for a valid non-hit in an order starting based on a current column selection state of the first-level metadata predictor.

17. The computer program product of claim 15, wherein the one or more entries of the first-level metadata predictor that are non-hits are selected for writing to the second-level metadata predictor based on a least-recently-used indicator associated with the one or more entries.

18. The computer program product of claim 17, wherein the program instructions executable by the processing circuit are further configured to perform the operations comprising:
setting a new or updated entry of the first-level metadata predictor as most-recently used;
setting the entry of the first-level metadata predictor comprising the hit as most-recently used based on finding the metadata prediction in the first-level metadata predictor; and
setting the one or more entries written to the second-level metadata predictor as most-recently used.

19. The computer program product of claim 17, wherein the metadata comprises branch instruction prediction data, and the program instructions executable by the processing circuit are further configured to perform the operations comprising:
installing branch instruction prediction data associated with one or more surprise branches into the first-level metadata predictor and the second-level metadata predictor; and
setting a plurality of entries comprising the branch instruction prediction data associated with one or more surprise branches as most-recently-used in the first-level metadata predictor and the second-level metadata predictor.

20. The computer program product of claim 15, wherein the program instructions executable by the processing circuit are further configured to perform the operations comprising:
searching the second-level metadata predictor for the metadata prediction;
queuing any hit for writing into the first-level metadata predictor through one or more write queues; and
performing a read-before-write check of the first-level metadata predictor based on data in the one or more write queues and directory information of the first-level metadata predictor to prevent duplicate installs of metadata in the first-level metadata predictor.

* * * * *